(12) United States Patent
May et al.

(10) Patent No.: US 6,820,417 B2
(45) Date of Patent: Nov. 23, 2004

(54) EXHAUST AFTERTREATMENT SYSTEM AND METHOD FOR AN INTERNAL COMBUSTION ENGINE

(75) Inventors: David F. May, Columbus, IN (US); Charles R. Schenk, Ypsilanti, MI (US); Louis A. Krempel, Columbus, IN (US); H. Lee Fisher, Columbus, IN (US); Angela R. May, Columbus, IN (US)

(73) Assignee: Analytical Engineering, Inc., Columbus, IN (US)

( * ) Notice: Subject to any disclaimer, the term of this patent is extended or adjusted under 35 U.S.C. 154(b) by 0 days.

(21) Appl. No.: 10/306,044

(22) Filed: Nov. 27, 2002

(65) Prior Publication Data

US 2003/0115860 A1 Jun. 26, 2003

Related U.S. Application Data

(60) Provisional application No. 60/334,202, filed on Nov. 29, 2001, provisional application No. 60/394,101, filed on Jul. 6, 2002, provisional application No. 60/405,056, filed on Aug. 21, 2002, provisional application No. 60/405,057, filed on Aug. 21, 2002, and provisional application No. 60/405,058, filed on Aug. 21, 2002.

(51) Int. Cl.$^7$ .............................................. F01N 3/00
(52) U.S. Cl. ............................ 60/297; 60/274; 60/288; 60/301; 422/169; 422/177
(58) Field of Search ..................... 60/274, 276, 286, 60/287, 288, 295, 297, 301, 311; 422/169, 170, 171, 177, 191, 193

(56) References Cited

U.S. PATENT DOCUMENTS

| 5,388,406 A | * | 2/1995 | Takeshima et al. | 60/301 |
| 5,406,790 A | * | 4/1995 | Hirota et al. | 60/286 |
| 5,474,745 A | * | 12/1995 | Fukui et al. | 422/171 |
| 5,771,686 A | | 6/1998 | Pischinger et al. | 60/274 |
| 5,974,791 A | * | 11/1999 | Hirota et al. | 60/286 |
| 6,082,100 A | * | 7/2000 | Boegner et al. | 60/286 |
| 6,105,365 A | * | 8/2000 | Deeba et al. | 60/288 |

(List continued on next page.)

FOREIGN PATENT DOCUMENTS

| JP | 06-050132 | * | 2/1994 |
| JP | 06-134258 | * | 5/1994 |
| JP | 06-307231 | * | 11/1994 |

Primary Examiner—Tu M. Nguyen
(74) Attorney, Agent, or Firm—Taylor & Aust, P.C.

(57) ABSTRACT

An exhaust aftertreatment system for use with an internal combustion engine includes at least one leg having a multi-stage NOx adsorber, with each NOx adsorber stage corresponding to a different temperature range of NOx adsorption. In a multi-pass aftertreatment system, a manifold has at least one inlet and a plurality of outlets. A plurality of legs are connected with a respective manifold outlet. Each leg has a NOx adsorber therein. At least one valve is positioned in association with at least one leg for at least partially opening and closing the at least one leg.

27 Claims, 9 Drawing Sheets

U.S. PATENT DOCUMENTS

| | | | |
|---|---|---|---|
| 6,119,451 A | 9/2000 | Vogtlin et al. | 60/274 |
| 6,122,910 A | 9/2000 | Hoshi et al. | 60/297 |
| 6,170,259 B1 * | 1/2001 | Boegner et al. | 60/288 |
| 6,185,929 B1 | 2/2001 | Ishizuka et al. | 60/274 |
| 6,202,407 B1 | 3/2001 | Brusasco et al. | 60/274 |
| 6,276,132 B1 | 8/2001 | Kanesaka et al. | 60/286 |
| 6,293,096 B1 | 9/2001 | Khair et al. | 60/286 |
| 6,375,910 B1 * | 4/2002 | Deeba et al. | 60/297 |
| 6,397,586 B1 | 6/2002 | Sakurai et al. | 60/288 |
| 6,422,006 B2 | 7/2002 | Ohmori et al. | 60/297 |
| 6,460,328 B1 | 10/2002 | Hertzberg | 60/285 |
| 6,471,924 B1 | 10/2002 | Feely et al. | 423/213.5 |
| 2001/0005988 A1 | 7/2001 | Russell | 60/295 |
| 2001/0010151 A1 | 8/2001 | Russell | 60/286 |
| 2001/0011455 A1 | 8/2001 | Harima et al. | 60/288 |
| 2002/0044897 A1 | 4/2002 | Kakwani et al. | 422/172 |
| 2002/0073694 A1 | 6/2002 | Minami | 60/288 |
| 2002/0128146 A1 | 9/2002 | Druckhammer et al. | 502/20 |
| 2002/0139112 A1 | 10/2002 | Onodera et al. | 60/286 |
| 2002/0141908 A1 | 10/2002 | Miyoshi et al. | 422/168 |
| 2002/0159926 A1 | 10/2002 | Hanaoka et al. | 422/177 |

* cited by examiner

EXHAUST AFTERTREATMENT SYSTEM AND METHOD FOR AN INTERNAL COMBUSTION ENGINE

CROSS REFERENCE TO RELATED APPLICATIONS

This is a non-provisional patent application based upon U.S. provisional patent application Ser. No. 60/334,202, entitled "On Vehicle Multi-Pass Valve Flow Controlled Exhaust After-Treatment System", filed Nov. 29, 2001; 60/394,101, entitled "Multi-Pass Exhaust Flow Control Valve", filed Jul. 6, 2002; 60/405,056, entitled "Low Cost Replaceable Element Aftertreatment System", filed Aug. 21, 2002; 60/405,057, entitled "Multi-Stage NOx Adsorber Elements for Exhaust Aftertreatment Systems", filed Aug. 21, 2002; and 60/405,058, entitled "Low Pressure Fuel Injector", filed Aug. 21, 2002.

BACKGROUND OF THE INVENTION

1. Field of the Invention

The present invention relates to exhaust aftertreatment systems for use with combustion engines, and, more particularly, to exhaust aftertreatment systems for use with diesel engines.

2. Description of the Related Art

The control of nitrogen oxide (NOx) emissions from internal combustion engines and particulate matter (PM) emissions from compression (diesel) combustion engines is an environmental problem. Gasoline engine vehicles use three-way catalysts to control such emissions, because their exhaust gases lack oxygen. But so-called "lean-burn" gas engines and diesel engines have enough oxygen in their exhausts that conventional catalytic systems are not effective. Lean-burn, high air-to-fuel ratio, engines are certain to become more important in meeting the mandated fuel economy requirements of next-generation vehicles. Fuel economy is improved since operating an engine stoichiometrically lean improves the combustion efficiency and power output. But excessive oxygen in lean-burn and diesel engine exhausts inhibit NOx removal in conventional three-way catalytic converters. An effective and durable catalyst for controlling NOx emissions under net oxidizing conditions is also critical for lean burn and diesel engines.

Exhaust emission control systems which have a NOx adsorber are known, in particular for cleaning exhaust gas from motor-vehicle combustion engines operated predominantly on a lean mixture. In lean operating phases of the combustion device emitting the exhaust gas to be cleaned, such as a motor-vehicle spark-ignition engine operated predominantly on a lean mixture or a diesel engine, the NOx adsorber stores NOx contained in the exhaust gas by adsorption. It is possible for the NOx not to be reduced adequately to nitrogen, for example by a three-way catalyst, because of the oxygen excess and consequently the lack of reducing agents in the exhaust gas. The loading of the NOx adsorber, also known as a nitrogen-oxide adsorber catalyst, with NOx, mainly in nitrate form, increases continuously in the course of a lean operating phase. When its storage capacity is exhausted and it cannot adsorb any further NOx, a changeover is made from the lean operation of the combustion device, which corresponds to an adsorption phase of the NOx adsorber, briefly to a rich operating phase, in which the NOx adsorber is fed an exhaust gas with an at most stoichiometric exhaust air ratio (generally with a substoichiometric air ratio, i.e., with a rich composition of the exhaust gas). This may take place, for example, by changing over the combustion device from the previous lean operation with an at least stoichiometric oxygen component in the fuel/air mixture to be burned to rich operation with a rich mixture; by injecting reducing agents directly into the exhaust gas upstream of the NOx adsorber; and/or by other methods. The rich operating phase corresponds to a regeneration phase of the NOx adsorber, in which the NOx temporarily stored in it are desorbed and then converted by reducing agents adequately present in the fed-in rich exhaust gas. The conversion may take place, for example, in the nitrogen-oxide adsorber body itself if a three-way catalyst is integrated therein; or in a downstream nitrogen-oxide reduction catalyst; or, for example, also by exhaust gas recirculation. The use of a three-way catalyst ensures effective NOx conversion even in the stoichiometric range of the combustion device.

Typical fuels for internal combustion engines contain sulfur. When such a fuel is burned, sulfur contained in the fuel is caused to burn and produce oxides of sulfur (SOx), such as $SO_2$ and $SO_3$, which become exhaust gas components. When the exhaust gas containing SOx reaches the catalyst, SOx is apt to be adsorbed onto the catalyst whereby stable inorganic sulfates are formed. Since the sulfates are more stable than nitrates, the sulfates are difficult to decompose and release, and tend to be accumulated in the catalyst. If the amount of SOx accumulated in the catalyst increases, the ability of the catalyst to adsorb and thus reduce other harmful components (HC, CO, NOx) in the exhaust gas may deteriorate. This is generally called "sulfur poisoning".

A particulate filter, also commonly used with diesel engines, is used to prevent carbon particles from soot or PM from exiting the tailpipe. Since the particulate filter has a limited storage capacity, it is periodically regenerated. In one approach, during the regeneration process, exhaust temperature is increased to ignite carbon particles stored in the particulate filter. By burning the stored carbon particles, the filter is regenerated and able to again store the carbon particles.

What is needed in the art is an exhaust aftertreatment system and method for a diesel engine which more effectively reduces NOx and PM.

SUMMARY OF THE INVENTION

The present invention provides a diesel engine exhaust aftertreatment system that reduces NOx and PM. The aftertreatment system may include one or more exhaust flow paths, or "legs", and each leg of the exhaust system may contain any combination of an injector, NOx adsorber element(s), with an upstream or downstream diesel oxidation catalyst, and optional upstream or downstream particulate trap or other substrate. A single pass exhaust aftertreatment system may also contain an exhaust bypass. A multi-pass exhaust aftertreatment system includes multiple exhaust legs, whereby the individual flow paths can be partially or fully blocked by a valve while the exhaust continues to flow from the engine to atmosphere through the open flow path(s). A small amount of exhaust continues to flow through the leg that is blocked by the system valve, and only a small amount of auxiliary fuel is required to change the lean exhaust to rich, such that the NOx adsorber can be regenerated. The other leg(s) of the exhaust system continue to adsorb NOx during normal operation, enabling the total system to emit low NOx and PM during the entire engine's operating regime.

The invention comprises, in one form thereof, an exhaust aftertreatment system for use with an internal combustion engine. A manifold has at least one inlet and a plurality of outlets. A plurality of legs are connected with a respective manifold outlet. Each leg has a NOx adsorber therein. At least one valve is positioned in association with at least one leg for at least partially opening and closing at least one leg.

The invention comprises, in another form thereof, an exhaust aftertreatment system for use with an internal combustion engine. At least one leg has a multi-stage NOx adsorber, with each NOx adsorber stage corresponding to a different temperature range of NOx adsorption.

An advantage of the present invention is that the NOx adsorber elements may be configured as replaceable elements.

Yet another advantage is that the NOx adsorber elements may be coated with a material to improve NOx adsorption over a broader temperature range.

Still another advantage is the exhaust aftertreatment system is relatively low cost in comparison with existing systems.

A still further advantage is that the exhaust aftertreatment system may be provided with a low cost fuel injector.

Another advantage is that in a multi-pass system, exhaust flow control valves and exhaust aftertreatment regeneration strategies are provided.

Yet another advantage is that the exhaust aftertreatment system is designed for compact installation on a mobile vehicle platform, but may also be installed on stationary engine applications, such as a generator.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
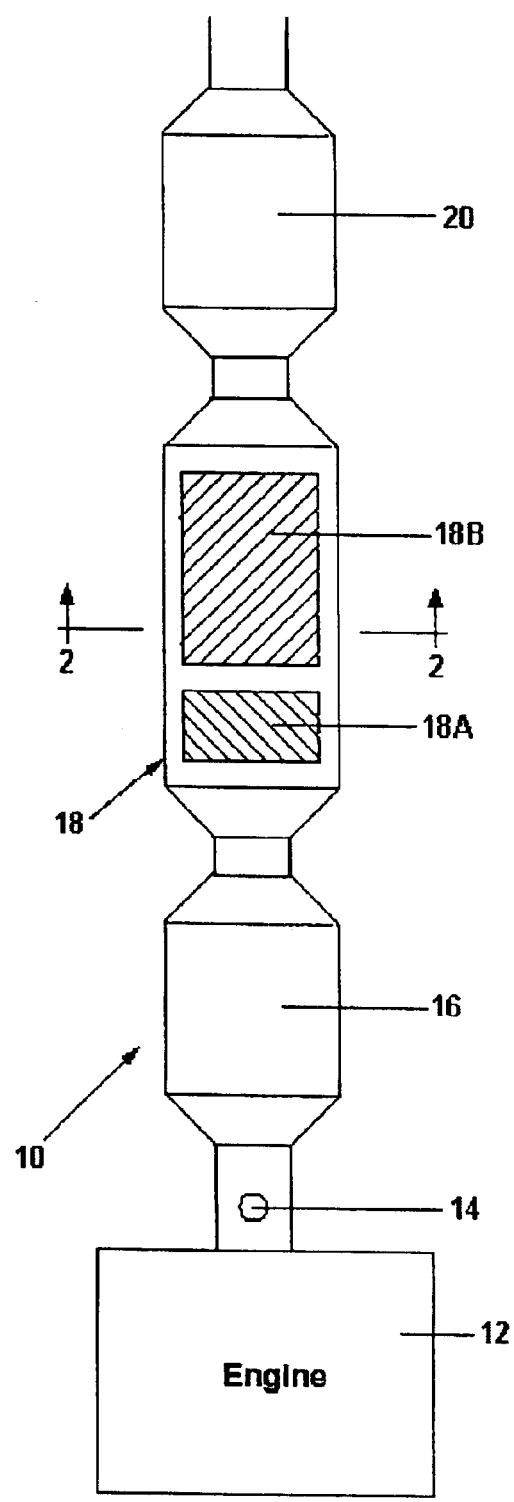
FIG. 1 is a schematic illustration of an embodiment of an exhaust aftertreatment system of the present invention.

Referring now to the drawings, and more particularly to FIG. 1, there is shown an embodiment of an exhaust aftertreatment system 10 of the present invention coupled with a diesel engine 12. Exhaust aftertreatment system 10 generally includes a fuel injector 14, catalyzed diesel particulate filter 16, NOx adsorber 18 and oxidation catalyst 20.

Figure 2:
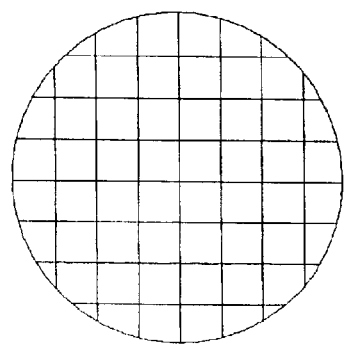
FIG. 2 is a cross-sectional view taken along line 2—2 in FIG. 1.

NOx adsorber 18 includes multi-stage NOx adsorber elements 18A and 18B in order to enhance NOx adsorption across the full engine exhaust temperature range. As shown in FIG. 2, NOx adsorber elements 18A and 18B have an arrayed plate or other suitable configuration providing an increased surface area for improved adsorption. NOx adsorption efficiency is a function of the substrate washcoat material and the exhaust temperature. Multi-stage NOx adsorber elements 18A and 18B utilize a substrate material optimized for low temperature adsorption in series with a substrate or multiple substrate elements that have been wash-coated for higher temperature adsorption. In the embodiment shown, upstream NOx adsorption element 18A includes a titanium salt wash-coated substrate and NOx adsorption element 18B includes a barium carbonate wash-coated substrate. Adsorbers with a titanium-based wash-coat have also been found to be particularly effective at low temperature and light load engine operation conditions. However, at higher temperature regions, the titanium adsorber will desorb the NOx it has collected. If NOx is desorbed at the higher temperature, then the barium carbonate adsorber element functions to capture the NOx that has desorbed from the titanium-based element. This allows the overall NOx adsorber collection efficiency to be maximized across the entire engine exhaust operating temperature range.

Different wash-coat materials are inherently more efficient at NOx adsorption at different temperature ranges. For example, titanium and strontium based wash-coats perform better at low exhaust temperature ranges, typically produced around idle or low load on a diesel engine. Barium and sodium are good for a fairly broad middle-to-high temperature range, and potassium adsorbs well at high temperatures. Current NOx adsorber technology suggests a somewhat homogeneous application of a combination of these wash-coat materials. One problem that has been encountered with these adsorbers is that NOx will desorb or "slip" at higher exhaust temperatures. Exhaust aftertreatment system 10 of the present invention as described above allows capture and continued accumulation of NOx across a broad temperature range by placing multiple adsorber elements in series.

Another possible configuration is to add a rare earth metal, such as platinum, to selective portions of the NOx adsorber element in order to assist in the conversion of all pollutants during a regeneration cycle, in addition to or in place of a 3-way catalyst. A fuel injector for the fuel (diesel, hydrogen, or other) is used to start the regeneration cycle and is placed upstream of the 3-way catalyst.

During operation, exhaust exits the diesel engine 12 and flows through particulate filter 16 to remove particulate matter. During normal operating conditions, at low exhaust temperatures, first NOx adsorber 18A adsorbs $NO_2$. During higher temperature operation, the $NO_2$ may be desorbed by the first NOx adsorber 18A and re-adsorbed by second adsorber element 18B, thus no net NOx is released in the event of desorption by the first adsorber 18A. The exhaust then flows through oxidation catalyst 20. During a regeneration cycle, fuel is injected by fuel injector 14 at a location upstream of particulate filter 16, thus initiating a regeneration cycle. The NOx reacts with the HC and CO in the exhaust under fuel-rich conditions, either in a 3-way catalyst or in the NOx adsorber if it at least one of the elements has been doped with platinum. This reaction will result in a reduction of the pollutant gases by converting them to $N_2$, $O_2$, $CO_2$, and $H_2O$.

Figure 3:
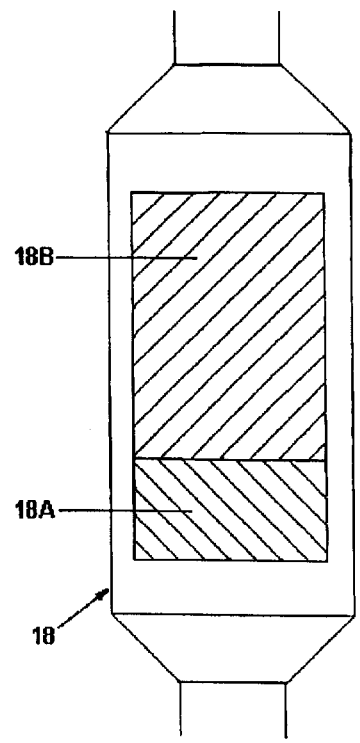
FIG. 3 is a schematic illustration of another embodiment of a NOx adsorber which may be used with the exhaust aftertreatment system shown in FIG. 1.
Figure 4:
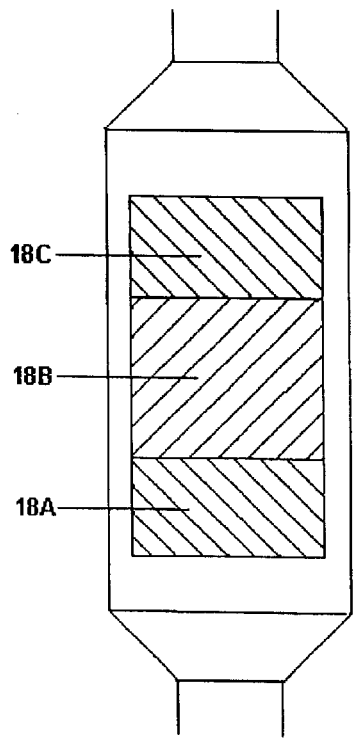
FIG. 4 is a schematic illustration of yet another embodiment of a NOx adsorber which may be used with the exhaust aftertreatment system shown in FIG. 1.
Figure 5:
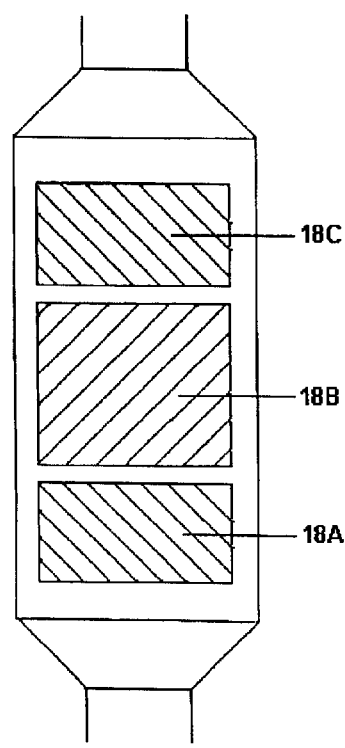
FIG. 5 is a schematic illustration of still another embodiment of a NOx adsorber which may be used with the exhaust aftertreatment system shown in FIG. 1.

In the embodiment of exhaust aftertreatment system 10 shown in FIGS. 1 and 2, NOx adsorber 18 includes NOx adsorber elements 18A and 18B which are serially arranged relative to each other in a spaced apart manner. However, as shown in FIG. 3, NOx adsorber 18 may include NOx adsorber elements 18A and 18B coated for adsorption at different temperature ranges which are integral with each other (i.e., washcoated separately on a single substrate). Moreover, as shown in FIGS. 4 and 5, NOx adsorber 18 may have a different number of adsorber elements (e.g., three as shown) 18A, 18B and 18C for operation at different temperature ranges, again either integral with (FIG. 4) or separate from (FIG. 5) each other.

Figure 6:
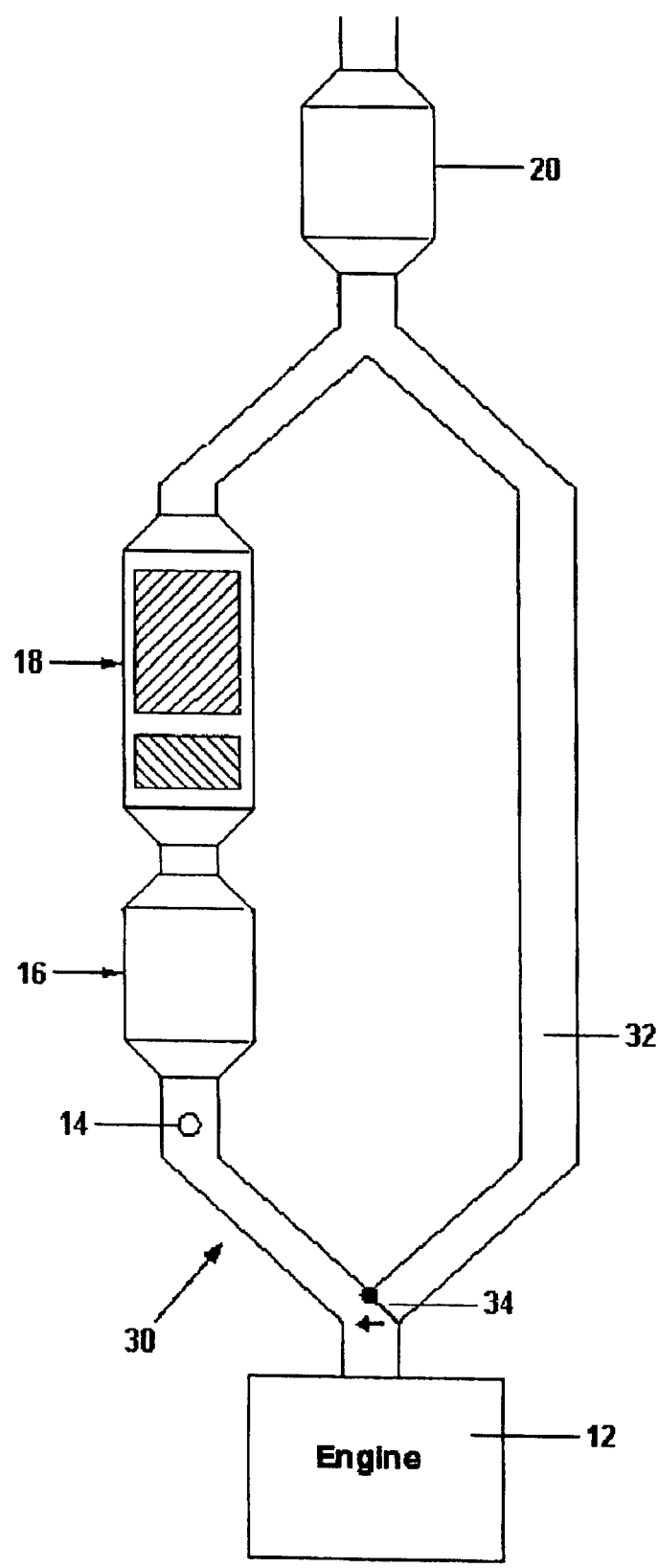
FIG. 6 is a schematic illustration of another embodiment of an exhaust aftertreatment system of the present invention.

FIG. 6 illustrates another embodiment of an exhaust aftertreatment system 30 of the present invention. Exhaust aftertreatment system 30 includes a particulate filter 16, NOx adsorber 18 and oxidation catalyst 20 similar to exhaust aftertreatment system 10 shown in FIG. 1. However, exhaust aftertreatment system 30 also includes an exhaust bypass 32 and bypass valve 34. Operation of bypass valve 34 using a suitable electronic onboard or other controller causes exhaust gas to flow through NOx adsorber 18 and/or exhaust bypass 32. Oxidation catalyst 20 is commonly positioned downstream from each of NOx adsorber 18 and exhaust bypass 32.

Figure 7:
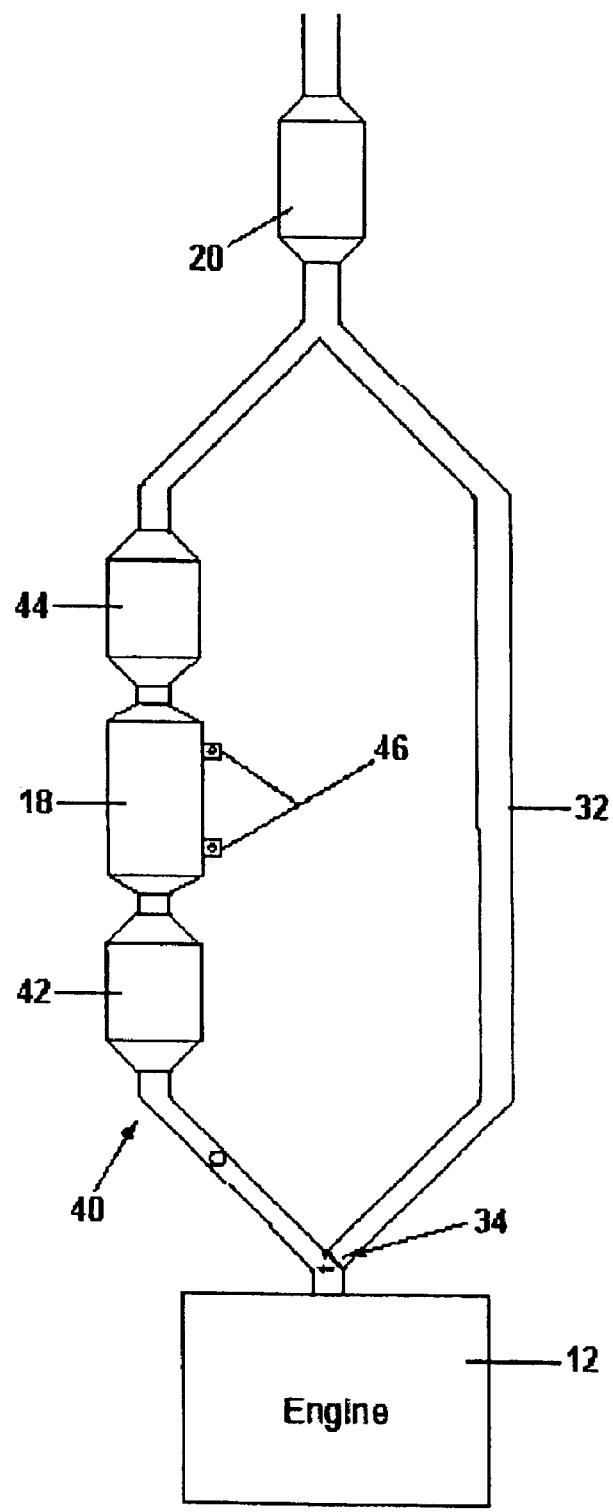
FIG. 7 is a schematic illustration of yet another embodiment of an exhaust aftertreatment system of the present invention.

FIG. 7 illustrates another embodiment of an exhaust aftertreatment system 40 including an exhaust bypass as shown in FIG. 6. However, exhaust aftertreatment system 40 includes an oxidation catalyst 42 and a 3-way rhodium/platinum/palladium oxidition catalyst 44.

According to another aspect of the present invention, NOx adsorber 18 may be configured with one or more replaceable NOx adsorber elements which are periodically replaced (e.g., based on sensed NOx levels, or at predetermined intervals based upon mileage or time). To this end, NOx adsorber 18 may be configured with a multi-part housing having suitable split lines, hinges, mounting flanges, bolt holes, etc. providing access to the interior of NOx adsorber 18. For example, NOx adsorber 18 shown in FIG. 7 includes flanges 46 providing access to NOx adsorber 18.

More particularly, a low cost replaceable NOx adsorber element of the present invention utilizes, e.g., an inexpensive wash-coated adsorber element, such as barium carbonate ($BaCo_3$) or barium oxide (BaO), containing very little or no rare earth metals to enable low cost replacement. Currently, legislated sulfur limit in diesel fuel used over the road is 0.05%, although the actual content of sulfur will vary from approximately 0.01 to 0.05%. Future EPA legislation requires 0.0015% sulfur diesel fuel by 2007 to maintain legal emission levels throughout the mandated useful life, for example 435,000 miles for heavy duty on-highway vehicles. Currently the sulfur content in diesel fuel contaminates the adsorber and renders the aftertreatment system ineffective long before the 435,000 mile mark. Sulfur "S-poisoning" of the adsorber is a normal phenomenon from the use of any diesel fuel with measurable sulfur content. As the adsorber is poisoned, its ability to adsorb NOx and other pollutants is diminished. Regeneration processes to release the sulfur are possible, but are in themselves harmful to the adsorber.

Currently, rare earth metals are used in the construction of NOx adsorbers. Platinum is one example of a rare earth metal used within the NOx adsorber element. The presence of rare earth metals promotes the conversion efficiency of NOx; however, it also makes the NOx adsorber system very expensive. The present invention eliminates the rare earth metals inside the NOx adsorber and moves the NOx reduction location from the adsorber to a 3-way catalyst at the outlet of the NOx adsorber. The NOx adsorber then becomes a NOx storage and release medium that is cost effectively replaced if the efficiency diminishes due to sulfur poisoning or other degradation. An inexpensive, replaceable NOx adsorber with 20,000 to 100,000 mile change intervals provides an effective, practical, and low cost after-treatment solution for current and future diesel engines.

Again referring to FIG. 7, exhaust aftertreatment system 40 is configured for the engine exhaust to first flow through an oxidation catalyst 42 (such as a Platinum based metal substrate element) to oxidize hydrocarbon species in the exhaust and oxidize NO to $NO_2$. Next, the exhaust enters NOx adsorber with replaceable NOx adsorption elements therein. NOx adsorber 18 includes a wash-coated substrate, potentially a ceramic material with a multitude of parallel channels that provides a very large surface area over which the exhaust can flow. The material that may be wash-coated onto the surface of the substrate is composed of a compound that undergoes ion exchange with NOx molecules, such that the NOx molecules accumulate on the adsorber element. The compound used for wash-coating may be any one or combination of several carbonate compounds, such as barium carbonate ($BaCO_3$). Several other carbonate and oxide compounds (chemical formula: $XCO_3$ or XO, where X=Sr, Ti, Ba, Na, and K) have been shown to be viable materials for adsorbing NOx.

As the NOx molecule travels over the wash-coated site, the $BaCO_3$ conducts ion exchange with the NOx, and $BaCO_3$ releases $CO_2$ and adsorbs $NO_2$ to become $BaNO_3$. In the case of barium carbonate, the chemical equilibrium equation is:

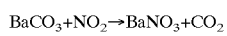

$$BaCO_3 + NO_2 \rightarrow BaNO_3 + CO_2$$

This basic ion exchange would also hold true for any composition $XCO3$ or XO, as described above. The efficiency of the chemical process of NOx adsorption is temperature dependent, with barium providing a very good coverage over a wide temperature range. The other carbonate and oxide compounds listed above will provide NOx adsorption in the temperature range not covered by barium carbonate; therefore, a combination of $BaCO_3$ with some of the other compounds will provide the best overall system performance. At the outlet of NOx adsorber 18, the exhaust flows into a traditional 3-way catalyst 44 (i.e., platinum/paladium/rhodium), similar to that used on modern gasoline engines. During regeneration, a reductant such as diesel fuel or hydrogen, is injected into the exhaust, upstream of oxidation catalyst 42. The NOx is released from the NOx adsorber 18 and enters 3-way catalyst 44 at the outlet of the system in near stoichiometric or fuel-rich conditions. This chemical makeup of the exhaust reduces the NOx, HC, and CO into $N_2$, $O_2$, $CO_2$, and $H_2O$.

At periodic intervals (based on sensed NOx levels, or periodically ranging from every other oil change to perhaps once per year, dependent on engine, application, and duty cycle) the adsorber is replaced by removing the marmon-flange style clamps 46, dropping out the "poisoned" catalyst, and replacing it with a new one. The exact mechanical attachment of the NOx adsorber element into the system may vary depending a number of factors.

Figure 8:
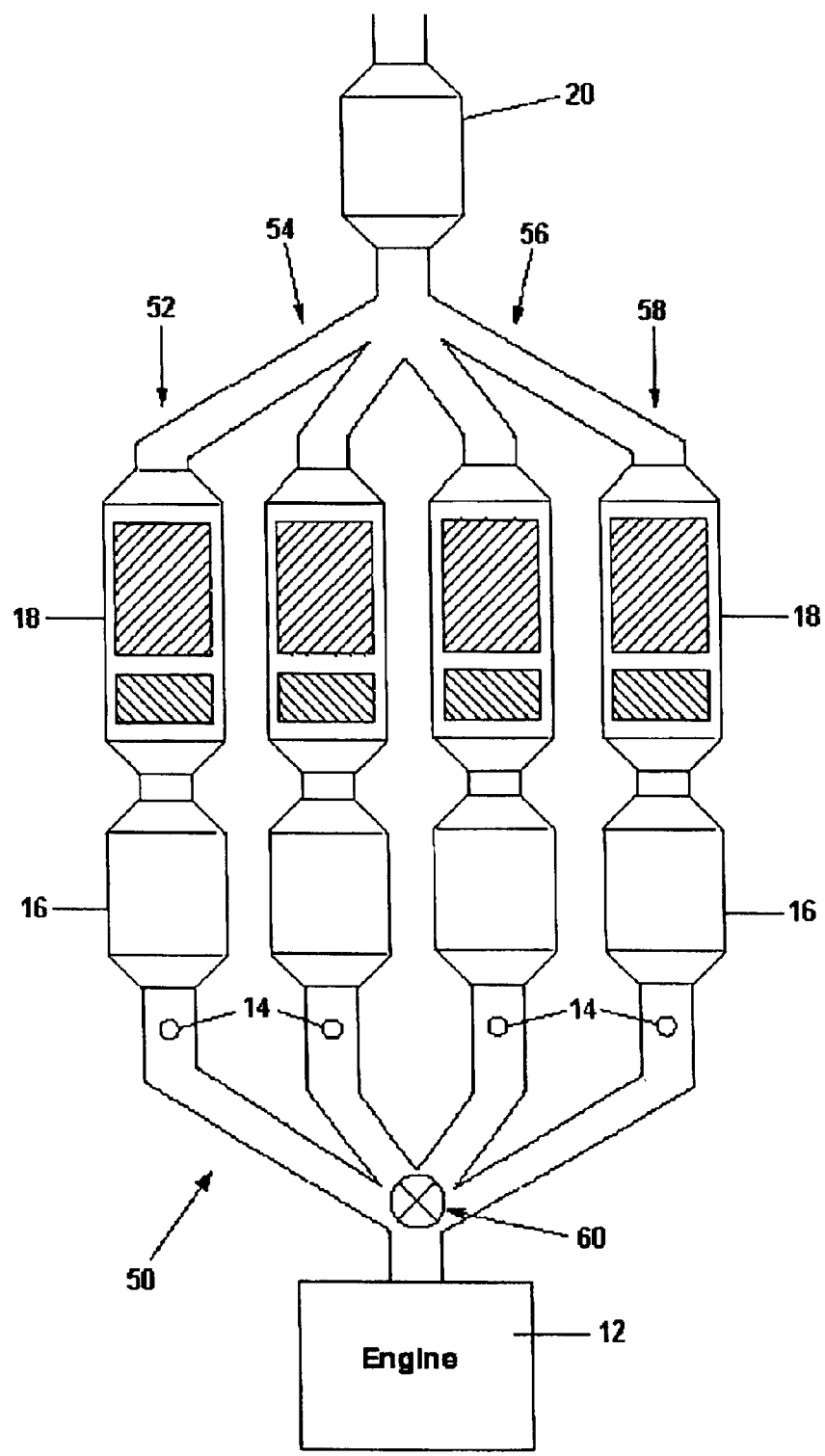
FIG. 8 is a schematic illustration of an embodiment of a multi-leg exhaust aftertreatment system of the present invention.
Figure 9:
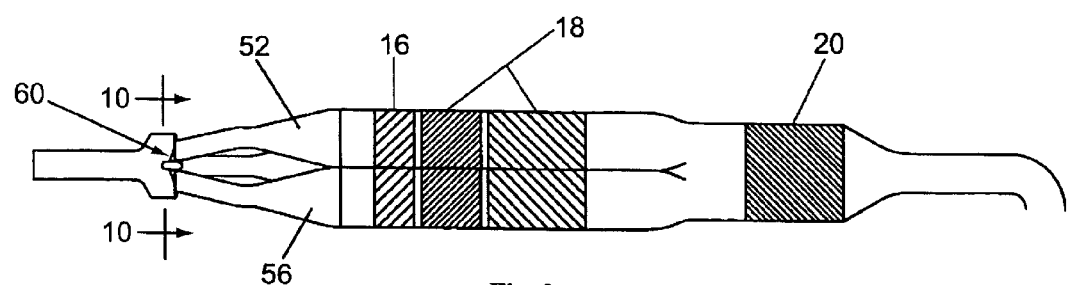
FIG. 9 is a side view of the multi-leg exhaust aftertreatment system shown in FIG. 8.

According to a further aspect of the present invention, the exhaust aftertreatment system may be configured as a multi-leg exhaust aftertreatment system, with a valve that allows the compression ignition engine exhaust to flow through one or more of the legs, bypassing one branch of the system that is regenerating under low flow conditions. FIG. 8 illustrates one embodiment of a multi-leg exhaust aftertreatment system 50 of the present invention. Exhaust aftertreatment system 50, shown schematically in FIG. 8, is shown more particularly in the side view of FIG. 9. Exhaust aftertreatment system 50 includes 4 legs in the embodiment shown in FIGS. 8 and 9, but may include any number of legs depending on the application (e.g., 2, 3, 5, etc.). Moreover, the multiple legs of exhaust aftertreatment system 50 are shown as extending generally parallel to each other, but may extend in other directions relative to each other depending on the application.

Figure 10:
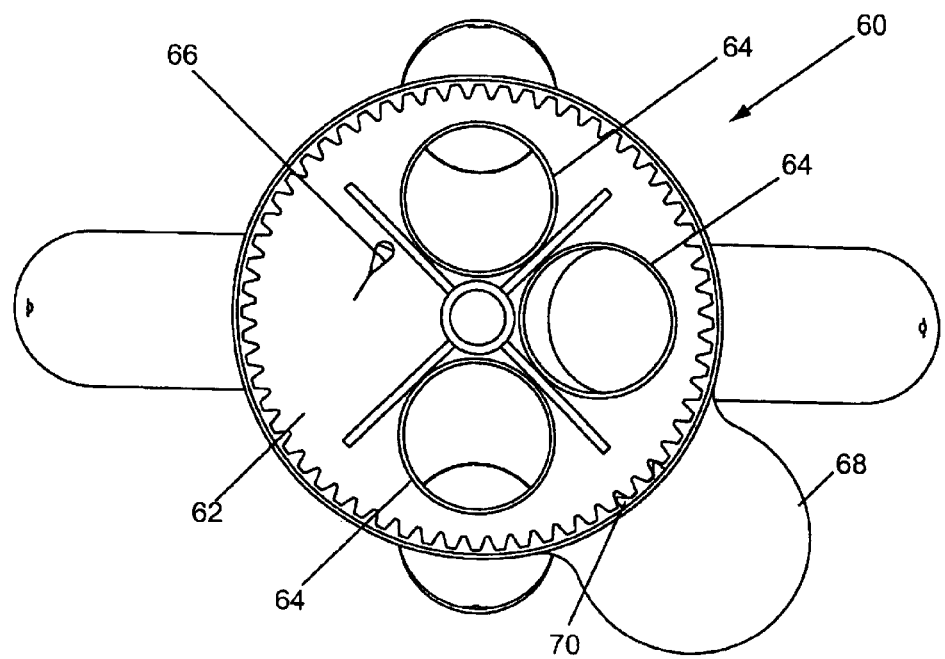
FIG. 10 is a sectional view of the valve shown in FIG. 9, taken along line 10—10.

Exhaust aftertreatment system 50 generally includes four legs 52, 54, 56 and 58 which are configured similar to the single leg shown in FIG. 1, with the principal difference being a single oxidation catalyst 20 located downstream from each leg. A valve 60 shown in detail in FIG. 10 is located upstream from each leg, and selectively at least partially opens and closes one or more legs of exhaust aftertreatment system 50. Valve 60 is in the form of a rotary valve including a flat disc 62 with holes 64 allowing the majority of the exhaust to flow to all but one of the four legs. Some small amount of exhaust flow is allowed to enter the blocked off leg through a flow control orifice 66, which is fixed as shown but may also be adjustable. The position of disc 62 is controlled by a rotary electric motor 68 via a gear drive to a ring gear 70 on the periphery of the disc 62.

Figure 11:
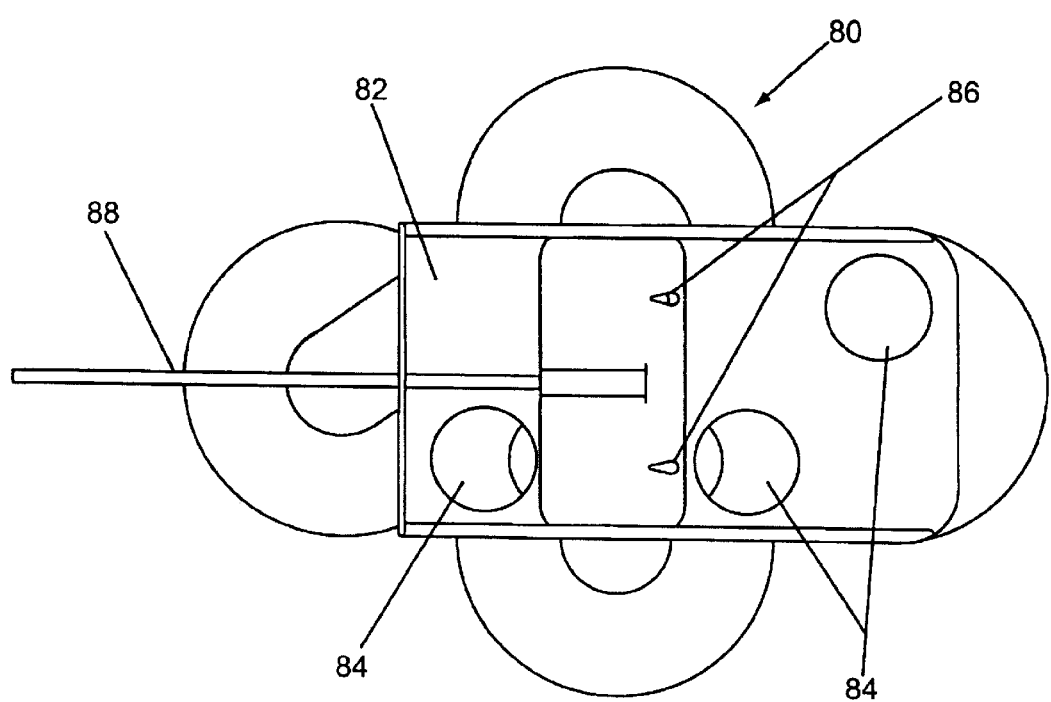
FIG. 11 is a sectional view of another embodiment of a multi-position valve which may be used with the multi-leg exhaust aftertreatment system shown in FIGS. 8 and 9.

Other types of valves positioned at the upstream end of each leg in a multi-leg system are also possible. For example, referring to FIG. 11, a flat blade sliding valve 80 includes a flat blade 82 with holes 84 allowing flow to a number of the legs. Flat blade 82 includes two flow control orifices 86 to controllably allow a small amount of exhaust flow to the blocked leg during regeneration. Flat blade 82 slides linearly to block off exhaust to a desired leg. Movement of valve 80 is controlled by a motor driven linear actuator (not shown) attached to a distal end of rod 88.

Figure 12:
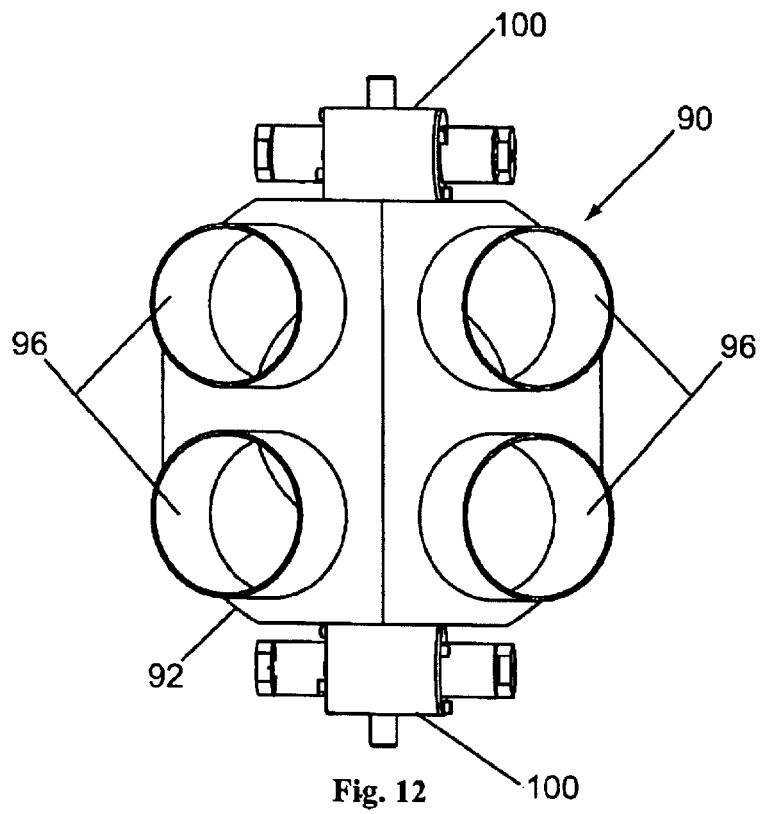
FIG. 12 is an end view as viewed from the outlet end of yet another embodiment of a multi-position valve which may be used with the multi-leg exhaust aftertreatment system shown in FIGS. 8 and 9.
Figure 13:
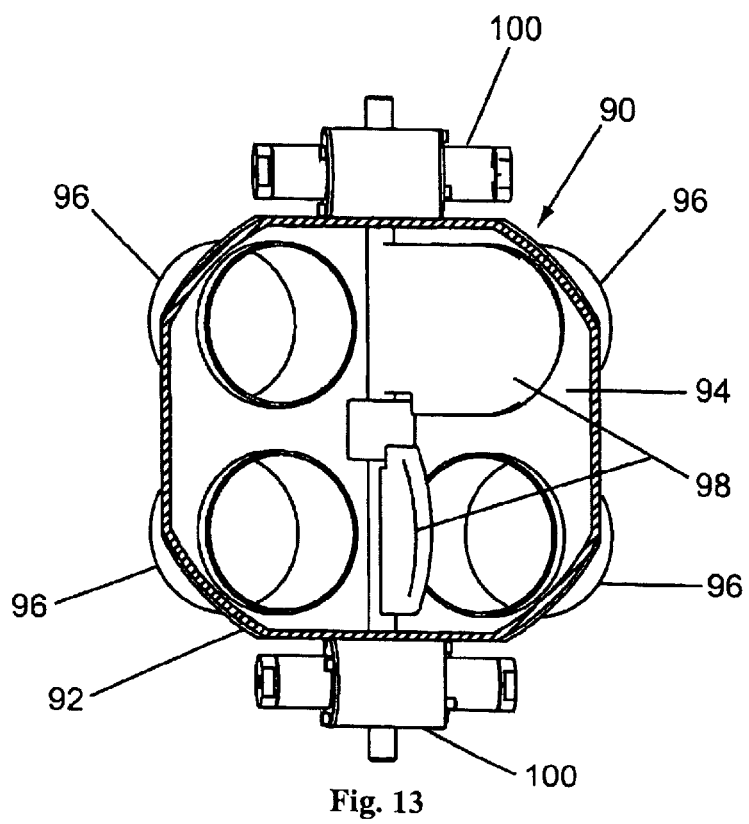
FIG. 13 is a sectional view as viewed from the inlet end of the multi-position valve shown in FIG. 12.

Yet another type of valve which may be used in a multi-leg system of the present invention is shown in FIGS. 12 and 13. Valve 90 is in the form of a pair of vane type valves which respectively block exhaust flow to one of two legs or assume a neutral position to allow exhaust flow through both legs. Valve 90 includes a valve body 92, with an inlet 94 and four outlets 96. Each vane 98 is controlled by a respective rotary actuator 100, and position feedback allows each vane 98 to be stopped or set in any position. Each vane 98 is independently controlled, allowing for any combination of exhaust legs to be open or closed, from all legs open to any two legs (not controlled by the same vane) closed at the same time. In FIG. 13, valve 90 is shown from the inlet side to the exhaust as it flows into the valve body 92 and is diverted through three of the four open exhaust legs, with one of vanes 98 covering one leg and the other vane 98 in a neutral position. Vane type valve 90 allows the control of exhaust flow in a small envelope with reduced control requirements, and allows the exhaust to flow through all legs for maximum trapping efficiency and reduced backpressure, rather than requiring a blocked flow path at all times.

Figure 14:
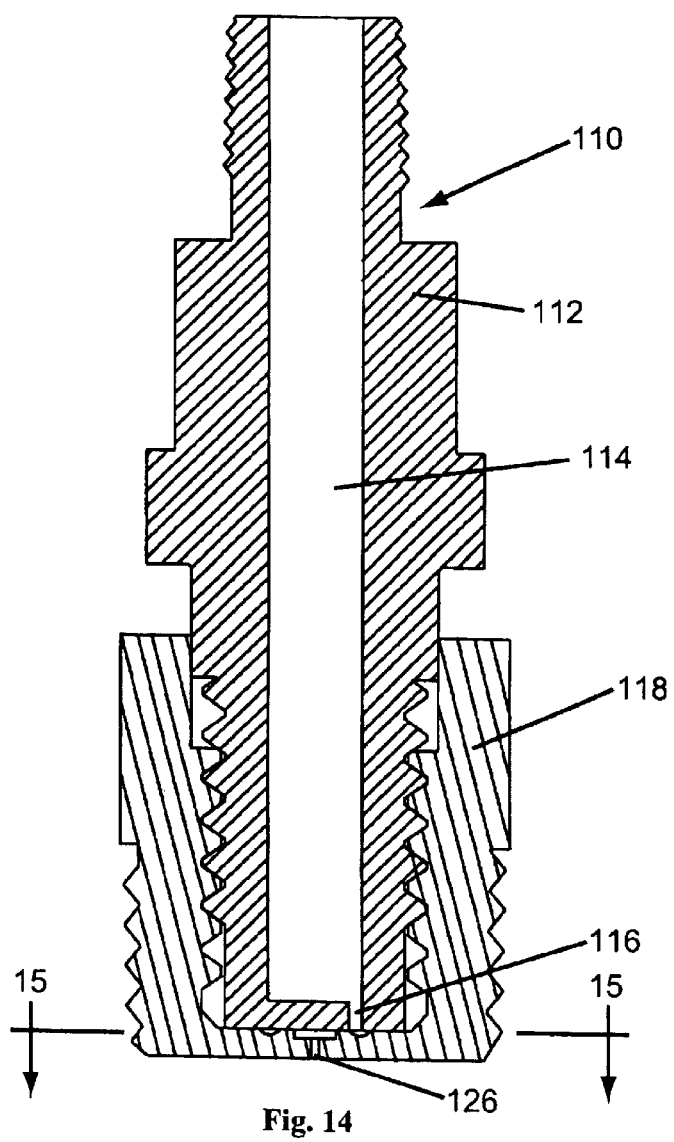
FIG. 14 is a side sectional view of an embodiment of a low pressure fuel injector which may be used with the exhaust aftertreatment system of the present invention.
Figure 15:
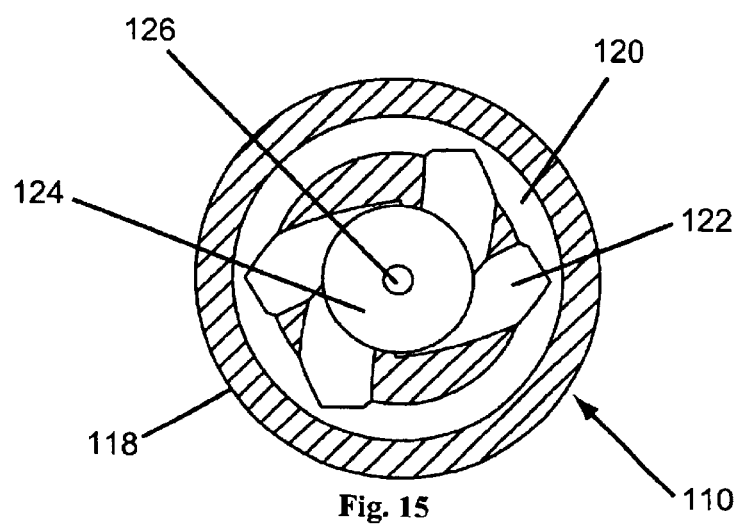
FIG. 15 is a sectional view of the low pressure fuel injector shown in FIG. 14, taken along line 15—15.

Acccording to yet another aspect of the present invention, a simple, low pressure, fuel or liquid and air or gaseous mixture injector 110 (FIGS. 14 and 15) delivers the fuel or liquid with a fine atomized spray with simple controls and low cost. The fuel, air, or gaseous mixture enters the injector body 112 via drilling 114 and through a small orifice 116 into injector cap 118. The fuel fills a circular gallery 120 (FIG. 15) in injector cap 118 and flows through shallow offset channels 122 into a mixing chamber 124 and out through a very small orifice 126. Fuel and/or air are supplied to the circular gallery by an offset drilling through the end of the injector body with a solenoid at the opposite end to control the supply of fuel, air or gaseous mixture. The restricted passages in concert with the offset channels create a very turbulent flow forming a finely atomized spray pattern at the injector exit. The injector is formed from only two pieces with no moving parts providing for a low cost, low pressure fuel injector.

Fuel injector 110 is intended for application as a hydrocarbon douser in an exhaust aftertreatment system. This injector may be placed in the exhaust pipe of an exhaust aftertreatment system, upstream of an oxidation catalyst and upstream of a NOx adsorber element. The advantage of this injector over previous designs is that it delivers a very fine atomization of fuel at very low injection pressures, generally less than 100 psi, with simple construction and very low cost.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An exhaust aftertreatment system for use with an internal combustion engine, comprising:
   a manifold having at least one inlet and a plurality of outlets;
   at least three legs, each said leg connected with a respective said manifold outlet, each said leg having a NOx adsorber therein; and
   at least one valve directing a substantially full flow of the exhaust to at least two of said at least three legs and a partial flow to at least one of said at least three legs.

2. The exhaust aftertreatment system of claim 1, wherein each said NOx adsorber includes a removable and replaceable NOx adsorber element.

3. The exhaust aftertreatment system of claim 1, wherein each said leg includes a NOx sensor.

4. The exhaust aftertreatment system of claim 1, wherein each said valve is positioned in association with a plurality of said legs.

5. The exhaust aftertreatment system of claim 1, wherein each said valve comprises one of a rotary valve, a sliding plate valve, and a vane type valve.

6. The exhaust aftertreatment system of claim 1, wherein each said valve is positioned within said manifold.

7. The exhaust aftertreatment system of claim 1, wherein each said valve includes a flow control orifice providing partial flow through said valve when in a closed position.

8. The exhaust aftertreatment system of claim 7, wherein said flow control orifice is a fixed orifice.

9. The exhaust aftertreatment system of claim 1, wherein each said leg includes a catalyzed diesel particulate filter positioned upstream from said NOx adsorber.

10. The exhaust aftertreatment system of claim 9, wherein each said leg includes a fuel injector positioned upstream from said catalyzed diesel particulate filter.

11. The exhaust aftertreatment system of claim 10, wherein each said leg includes at least one of an oxidation catalyst and an oxidation-reduction catalyst positioned downstream from said NOx adsorber.

12. The exhaust aftertreatment system of claim 11, further including a final oxidation catalyst positioned downstream from and in communication with each of said legs.

13. The exhaust aftertreatment system of claim 1, wherein each said NOx adsorber includes a multi-stage NOx adsorber, each said NOx adsorber stage corresponding to a different temperature range of NOx adsorption.

14. The exhaust aftertreatment system of claim 13, wherein said multiple NOx adsorber stages are serially arranged.

15. The exhaust aftertreatment system of claim 14, wherein said multiple NOx adsorber stages are serially arranged from a low temperature range to a high temperature range with respect to a flow direction.

16. The exhaust aftertreatment system of claim 14, wherein said multiple NOx adsorption stages are one of integrally connected and separate from each other.

17. The exhaust aftertreatment system of claim 13, wherein said multi-stage NOx adsorber is coated in a serial arrangement with different coating materials.

18. The exhaust aftertreatment system of claim 17, wherein each said coating material promotes adsorption at a different temperature range.

19. The exhaust aftertreatment system of claim 18, wherein each said coating material comprises one of a carbonate compound and oxide compound.

20. The exhaust aftertreatment system of claim 19, wherein each said coating material comprises one of barium carbonate, barium oxide, titanium carbonate, titanium dioxide, strontium carbonate, strontium oxide, sodium carbonate, sodium oxide, and potassium carbonate.

21. A method of aftertreating exhaust from an internal combustion engine, comprising the steps of:
providing at least three of legs, each said leg having a NOx adsorber therein;
positioning at least one valve in association with each said leg;
partially opening said valve associated with one of said at least three legs; and
substantially opening said valves associated with at least two of said at least three legs.

22. The method of aftertreating exhaust of claim 21, further including the step of adsorbing NOx within each said leg in a multi-stage manner, with each said NOx adsorption stage corresponding to a different temperature adsorption range.

23. The method of aftertreating exhaust of claim 21, further including the step of filtering particulates from the exhaust within each said leg upstream from said corresponding NOx adsorber.

24. The method of aftertreating exhaust of claim 21, further including the step of oxidizing the exhaust within each said leg downstream from said corresponding NOx adsorber.

25. The method of aftertreating exhaust of claim 21, further including the step of injecting fuel into at least one said leg upstream from said corresponding NOx adsorber.

26. The method of aftertreating exhaust of claim 21, further including the step of removing and replacing at least one said NOx adsorber element.

27. A motor vehicle, comprising:
an internal combustion engine; and
an exhaust aftertreatment system in communication with said internal combustion engine, including:
a manifold having at least one inlet and a plurality of outlets;
at least three legs, each said leg connected with a respective said manifold outlet, each said leg having a NOx adsorber therein; and
at least one valve directing a substantially full flow of the exhaust to at least two of said at least three legs and a partial flow to at least one of said at least three legs.

* * * * *